United States Patent
Chaganti et al.

(10) Patent No.: US 11,204,942 B2
(45) Date of Patent: Dec. 21, 2021

(54) METHOD AND SYSTEM FOR WORKLOAD AWARE STORAGE REPLICATION

(71) Applicant: Dell Products L.P., Hopkinton, MA (US)

(72) Inventors: Ravikanth Chaganti, Bangalore (IN); Dharmesh M. Patel, Round Rock, TX (US); Rizwan Ali, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 102 days.

(21) Appl. No.: 16/821,931

(22) Filed: Mar. 17, 2020

(65) Prior Publication Data

US 2021/0294816 A1    Sep. 23, 2021

(51) Int. Cl.
*G06F 15/16* (2006.01)
*G06F 16/27* (2019.01)
*G06F 9/50* (2006.01)

(52) U.S. Cl.
CPC ............ *G06F 16/27* (2019.01); *G06F 9/5083* (2013.01)

(58) Field of Classification Search
None
See application file for complete search history.

(56) References Cited

U.S. PATENT DOCUMENTS

| 9,785,505 B1* | 10/2017 | Narzisi | G06F 11/1464 |
| 2013/0006928 A1* | 1/2013 | Holden | G06F 16/184 707/622 |
| 2014/0297588 A1* | 10/2014 | Babashetty | G06F 11/3027 707/613 |
| 2016/0188420 A1* | 6/2016 | Freedman | G06F 16/951 707/640 |
| 2018/0095854 A1* | 4/2018 | Apte | G06F 11/1662 |

* cited by examiner

*Primary Examiner* — Alex Gofman
(74) *Attorney, Agent, or Firm* — Chamberlain, Hrdlicka, White, Williams & Aughtry

(57) ABSTRACT

A method and system for workload aware storage replication. Specifically, the disclosed method and system entail establishing preferential transports for critical workload data targeted for replication from one cluster infrastructure to another. Existing replication solutions fail to prioritize the replication of critical over non-critical workload data, which the disclosed method and system rectify.

16 Claims, 12 Drawing Sheets

METHOD AND SYSTEM FOR WORKLOAD AWARE STORAGE REPLICATION

BACKGROUND

Storage replication for data availability and disaster recovery is a known practice in enterprise data centers. Presently, however, storage replication methods do not differentiate between the replication needs of critical versus non-critical workloads hosted on these enterprise data centers.

SUMMARY

In general, in one aspect, the invention relates to a method for workload data replication. The method includes detecting a trigger event for a replication operation targeting a plurality of workloads hosted across a primary cluster infrastructure, populating, in response to detecting the trigger event, a replication queue using a plurality of workload identifiers (IDs) for the plurality of workloads, adjusting a replication order of the plurality of workload IDs in the replication queue based on a workload criticality class assigned to each workload, and replicating, based on the replication order, active workload data for the plurality of workloads to a secondary cluster infrastructure.

In general, in one aspect, the invention relates to a non-transitory computer readable medium (CRM). The non-transitory CRM includes computer readable program code, which when executed by a computer processor, enables the computer processor to detect a trigger event for a replication operation targeting a plurality of workloads hosted across a primary cluster infrastructure, populate, in response to detecting the trigger event, a replication queue using a plurality of workload identifiers (IDs) for the plurality of workloads, adjust a replication order of the plurality of workload IDs in the replication queue based on a workload criticality class assigned to each workload, and replicate, based on the replication order, active workload data for the plurality of workloads to a secondary cluster infrastructure.

In general, in one aspect, the invention relates to a system. The system includes primary and secondary cluster infrastructures, a computer processor interposed between and operatively connected to the primary and second cluster infrastructures, and a workload data replicator executing on the computer processor, and programmed to detect a trigger event for a replication operation targeting a plurality of workloads hosted across the primary cluster infrastructure, populate, in response to detecting the trigger event, a replication queue using a plurality of workload identifiers (IDs) for the plurality of workloads, adjust a replication order of the plurality of workload IDs in the replication queue based on a workload criticality class assigned to each workload, and replicate, based on the replication order, active workload data for the plurality of workloads to the secondary cluster infrastructure.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6G, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for workload aware storage replication. Specifically, one or more embodiments of the invention entails establishing preferential transports for critical workload data targeted for replication from one cluster infrastructure to another. Existing replication solutions fail to prioritize the replication of critical over non-critical workload data, which embodiments of the invention rectify.

Figure 1:
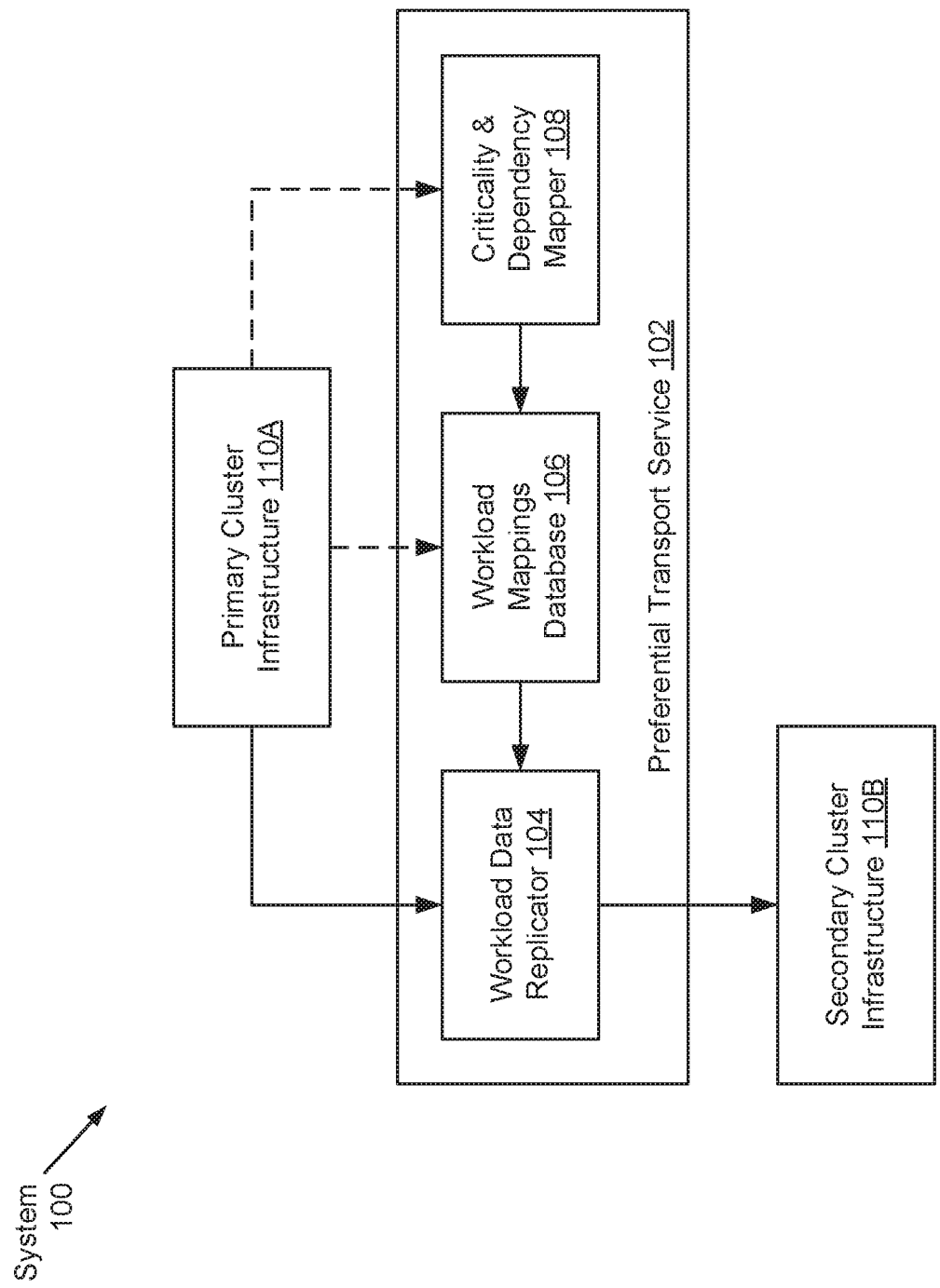
FIG. 1 shows a system in accordance with one or more embodiments of the invention.

FIG. 1 shows a system in accordance with one or more embodiments of the invention. The system (100) may include a preferential transport service (102) operatively connected to a primary cluster infrastructure (110A) and a secondary cluster infrastructure (110B). Each of these system (100) components is described below.

In one embodiment of the invention, the above-mentioned system (100) components may directly or indirectly connect to one another through a network (not shown) (e.g., a local area network (LAN), a wide area network (WAN) such as the Internet, a mobile network, any other network type, or any combination thereof). The network may be implemented using any combination of wired and/or wireless connections. In embodiments in which the above-mentioned system (100) components may be indirectly connected, the network may include networking devices or systems (e.g., switches, routers, gateways, etc.) configured to facilitate communications between the above-mentioned system (100) components. Further, the above-mentioned system (100) components may interact with another using any combination of wired and/or wireless communication protocols.

In one embodiment of the invention, the preferential transport service (102) may represent an enterprise storage replication service offering storage replication between sites (or datacenters), which may be pursued for various reasons, such as for data availability and/or for disaster recovery. The preferential transport service (102) may be implemented using one or more servers (not shown). Each server may represent a physical or virtual server, which may reside in a datacenter or a cloud computing environment. Additionally or alternatively, the preferential transport service (102) may be implemented using one or more computing systems similar to the exemplary computing system shown in FIG. 5. Furthermore, the preferential transport service (102) may include a workload data replicator (104), a workload mappings database (106), and a criticality and dependency mapper (108). Each of these preferential transport service (102) subcomponents is described below.

In one embodiment of the invention, the workload data replicator (104) may refer to a computer program that may execute on the underlying hardware of the preferential transport service (102). Generally, the workload data replicator (104) may queue and, subsequently, perform prioritized replication of workload data (and workloads)—synchronously or asynchronously—from the primary cluster infrastructure (110A) to the secondary cluster infrastructure (110B). To that extent, the workload data replicator (104) may include functionality to substantively perform the various steps outlined in the flowchart of FIG. 4 (described below), which may be directed to a method for replicating workload data in accordance with one or more embodiments of the invention. Further, one of ordinary skill will appreciate that the workload data replicator (104) may perform other functionalities without departing from the scope of the invention.

In one embodiment of the invention, the workload mappings database (106) may refer to a data repository for storing one or more workload mappings. A workload mapping may represent a database entry, including various information pertinent to a workload that may be hosted on the primary cluster infrastructure (110A). The aforementioned various information within a given workload mapping, and thus for a given workload, may include, but is not limited to: a workload identifier (ID) uniquely identifying the given workload (across the primary cluster infrastructure (110A)); a workload criticality class assigned to the given workload, which may reflect a replication prioritization of the given workload and/or its associated workload data; and storage metadata describing the storage state of the workload data associated with the given workload. The storage metadata may include, but is not limited to, one or more storage device addresses (or identifiers) uniquely identifying storage device(s) on which active workload data for the given workload may be stored; one or more storage device block addresses (or identifiers) uniquely identifying storage device block(s) within which active workload data for the given workload may specifically be stored on the storage device(s); and an active workload data size reflecting a storage size or space (in bytes) consumed by active workload data for the given workload. One of ordinary skill will appreciate that the workload mappings database (106) may store additional or alternative information without departing from the scope of the invention.

In one embodiment of the invention, the criticality and dependency mapper (108) may refer to a computer program that may execute on the underlying hardware of the preferential transport service (102). Generally, the criticality and dependency mapper (108) may obtain or derive workload criticality classes and storage metadata pertaining to workloads hosted on the primary cluster infrastructure (110A). To that extent, the criticality and dependency mapper (108) may include functionality to substantively perform the various steps outlined in the flowchart of FIG. 3 (described below), which may be directed to a method for populating the workload mappings database (106) in accordance with one or more embodiments of the invention. Further, one of ordinary skill will appreciate that the criticality and dependency mapper (108) may perform other functionalities without departing from the scope of the invention.

In one embodiment of the invention, the primary cluster infrastructure (110A) may refer to a configuration of various information technology (IT) components (e.g., servers, storage, networking, management, etc.) directed to hosting and maintaining various workloads, and their corresponding workload data. These workloads (described below) and workload data may be pertinent to the day-to-day operations of a given organization, or to various unaffiliated tenants. In contrast to the secondary cluster infrastructure (110B), the primary cluster infrastructure (110A) may remain predominantly active, and thus, may seldom experience inactivity. Inactivity of the primary cluster infrastructure (110A) may be caused by various reasons including, but not limited to, scheduled maintenance, unexpected power outages, and failover (e.g., due to hardware failure, data corruption, and/or software anomalies introduced through cyber security attacks or threats). The primary cluster infrastructure (110A) is described in further detail below with respect to FIG. 2.

In one embodiment of the invention, the secondary cluster infrastructure (110B), like the primary cluster infrastructure (110A), may refer to a configuration of various IT components directed to hosting and maintaining various workloads, and their corresponding workload data. Unlike the primary cluster infrastructure (110A), however, the secondary cluster infrastructure (110B) may remain predominantly inactive, and thus, may activate for periods of time to assume responsibilities of the primary cluster infrastructure (110A) when the primary cluster infrastructure (110A) experiences, for example, scheduled maintenance or failover. Subsequently, the secondary cluster infrastructure (110B) may represent a backup, archiving, and/or disaster recovery alternative for the primary cluster infrastructure (110A). The secondary cluster infrastructure (110B) is described in further detail below with respect to FIG. 2.

In one embodiment of the invention, a workload (not shown) may refer to a cluster infrastructure (110A, 110B) resource configured to perform certain work functions. Workloads may be instantiated, and may operate while consuming at least a portion of computing resources (e.g., processing, storage/memory, virtualization, networking, etc.) available, on the cluster infrastructure (110A, 110B). Examples of a workload may include, but are not limited to, a virtual machine, a container, a database, an application, and a collection of micro-services. Furthermore, workload data pertinent to a given workload may include, but is not limited to, output data generated by the given workload, input data necessary to the work function(s) of the given workload, configuration data definitive of the behavior and computing resources requirements of the given workload, and any metadata respective to any combination thereof.

While FIG. 1 shows a configuration of components, other system (100) configurations may be used without departing from the scope of the invention.

Figure 2:
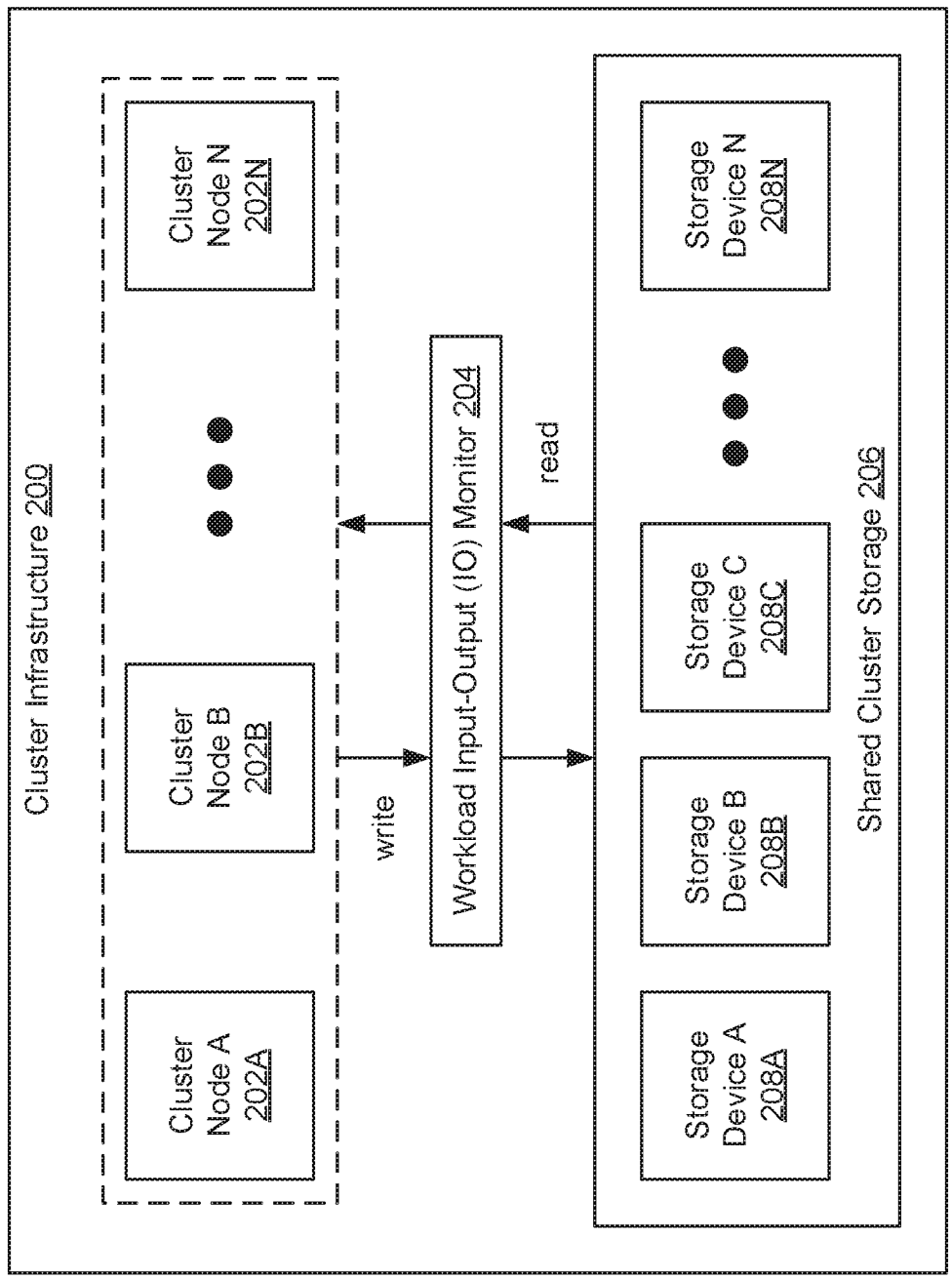
FIG. 2 shows cluster infrastructure in accordance with one or more embodiments of the invention.

FIG. 2 shows cluster infrastructure in accordance with one or more embodiments of the invention. The cluster infrastructure (200) may include one or more cluster nodes (202A-202N), a workload input-output (IO) monitor (204), and shared cluster storage (206). Each of these cluster infrastructure (200) subcomponents is described below.

In one embodiment of the invention, a cluster node (202A-202N) may represent a physical computing system dedicated to hosting one or more workloads (described above), or to providing a computing environment whereon workloads may be implemented. To that extent, a cluster node (202A-202N) may be configured with computing resources (e.g., processing, storage/memory, virtualization, networking, etc.), which may be provisioned and consumed, as needed, by the workload(s) hosted thereon. Furthermore, on behalf of the workload(s) hosted thereon, a cluster node (202A-202N) may include functionality to carry out read and/or write requests (i.e., input-output (IO) operations) to the shared cluster storage (206), thereby extending access to workload data respective to the workload(s). One of ordinary skill will appreciate that a cluster node (202A-202N) may perform other functionalities without departing from the scope of the invention. Moreover, a cluster node (202A-202N) may be implemented using a server, a mainframe, a workstation computer, or any other computing system similar to the exemplary computing system shown in FIG. 5.

In one embodiment of the invention, the workload IO monitor (204) may refer to a physical computing system (see e.g., FIG. 5) residing on, or a computer program that may execute on the underlying hardware of, the cluster infrastructure (200). Specifically, the workload IO monitor (204) may track IO accesses directed to the shared cluster storage (206) from workloads hosted across the cluster nodes (202A-202N). To that extent, the workload IO monitor (204) may include functionality to snoop on IO access requests in real- or near real-time, as well as maintain records reflecting historical IO access patterns exhibited by the various workloads hosted across the cluster infrastructure (200). The workload IO monitor (204) may include further functionality to capture or derive workload storage metadata (described above) from the aforementioned IO access requests and/or patterns. Subsequently, the workload IO monitor (204) may update the workload mappings database (see e.g., FIG. 1) directly using the captured/derived workload storage metadata or, alternatively, may provide the workload storage metadata to the criticality and dependency mapper (see e.g., FIG. 1). One of ordinary skill will appreciate that the workload IO monitor (204) may perform other functionalities without departing from the scope of the invention.

In one embodiment of the invention, the shared cluster storage (206) may refer to a collection of one or more physical storage devices (208A-208N) on which various forms of digital data—e.g., workload data pertinent to one or more workloads—may be consolidated. Each physical storage device (208A-208N) may encompass non-transitory computer readable storage media on which data may be stored in whole or in part, and temporarily or permanently. Further, each physical storage device (208A-208N) may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the shared cluster storage (206) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

While FIG. 2 shows a configuration of subcomponents, other cluster infrastructure (200) configurations may be used without departing from the scope of the invention. For example, in one embodiment of the invention, the shared cluster storage (206) may alternatively be implemented as a virtual storage pool (or a logical pool of disk capacity) formed from storage resources available across the cluster nodes (202A-202N).

Figure 3:
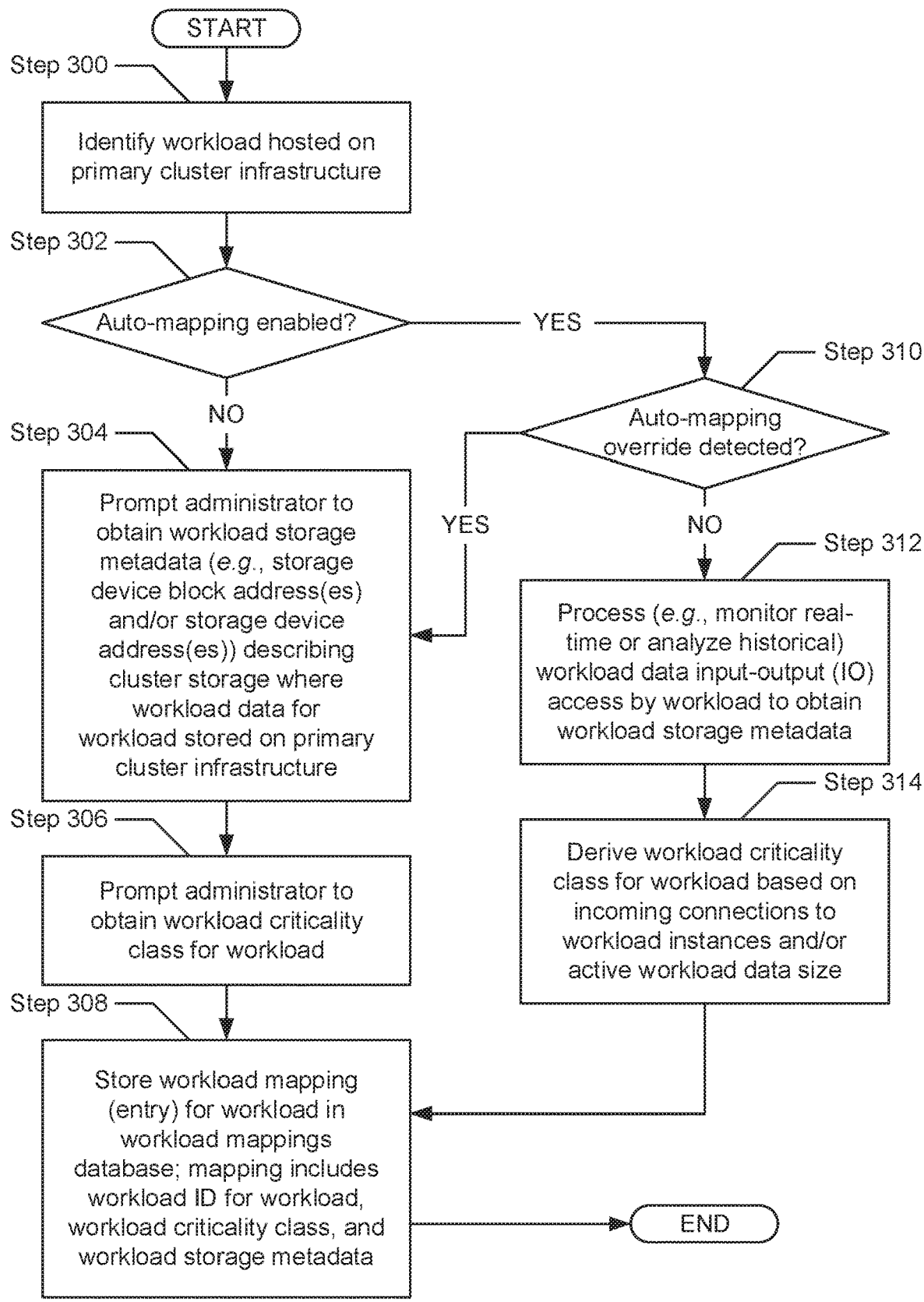
FIG. 3 shows a flowchart describing a method for populating a workload mappings database in accordance with one or more embodiments of the invention.

FIG. 3 shows a flowchart describing a method for populating a workload mappings database in accordance with one or more embodiments of the invention. The various steps outlined below may be performed by the preferential transport service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, one or more workloads, hosted across the primary cluster infrastructure (see e.g., FIG. 1), is/are identified. Thereafter, in Step 302, a determination is made as to whether an auto-mapping feature is enabled. In one embodiment of the invention, if it is determined that the auto-mapping feature is enabled, then the process proceeds to Step 310. On other hand, in another embodiment of the invention, if it is alternatively determined that the auto-mapping feature is disabled, then the process alternatively proceeds to Step 304.

In Step 304, following the determination (in Step 302) that an auto-mapping feature is disabled, a datacenter or network administrator is prompted to obtain workload storage metadata for the workload(s) (identified in Step 300). In one embodiment of the invention, the workload storage metadata for a given workload may include, but is not limited to: one or more storage device addresses (or identifiers) uniquely identifying storage device(s) on which active workload data for the given workload may be stored; one or more storage device block addresses (or identifiers) uniquely identifying storage device block(s) within which active workload data for the given workload may specifically be stored on the storage device(s); and an active workload data size reflecting a storage size or space (in bytes) consumed by active workload data for the given workload.

In Step 306, the above-mentioned datacenter or network administrator is further prompted to obtain a workload criticality class for the workload(s) (identified in Step 300). In one embodiment of the invention, the workload criticality class for a given workload may refer to a numerical value, a categorical value, or a character string (e.g., an alphanumeric value) that may reflect a replication prioritization of the given workload and/or its associated workload data. By way of an example, workload criticality classes, from highest to lowest priority, may be expressed using the following designations: (a) P0—highest (or platinum) priority; (b) P1—high (or gold) priority; (c) P2—low (or silver) priority; and (d) lowest (or bronze) priority. Other workload criticality classes may be used without departing from the scope of the invention.

In Step 308, a workload mapping for the workload(s) (identified in Step 300) is generated or updated. In one embodiment of the invention, each workload mapping may refer to a database entry maintained in a workload mappings database of the preferential transport service (see e.g., FIG. 1). Further, information within a given workload mapping, and thus for a given workload, may include, but is not limited to: a workload identifier (ID) uniquely identifying the given workload (across the primary cluster infrastructure); the workload criticality class (obtained in Step 304 or Step 312) assigned to the given workload; and the storage metadata (obtained in Step 304 or Step 310) describing the storage state of the workload data associated with the given workload.

In Step 310, following the determination (in Step 302) that an auto-mapping feature is enabled, a determination is made as to whether an override of the auto-mapping feature has been detected. That is, the above-mentioned auto-mapping feature may be overridden by a datacenter or network administrator for any number of exceptional scenarios. By way of an example, an exceptional scenario may entail workloads directed to directory services, where the number of active connections to the workloads may be few, however, the workloads themselves may be critical for overall management. Accordingly, in one embodiment of the invention, if it is determined that an auto-mapping feature override has been detected, then the process proceeds to Step 304, where the administrator may be prompted for workload storage metadata and/or workload criticality classes for one or more workloads. On the other hand, in another embodiment of the invention, if it is alternatively determined that the auto-mapping feature has not been overridden, then the process alternatively proceeds to Step 312.

In Step 312, following the determination (in Step 310) that an enabled auto-mapping feature has been overridden, input-output (IO) accesses, directed to workload data for the workload(s) (identified in Step 300), are processed. In one embodiment of the invention, processing of the IO accesses may entail real-time monitoring, or analyses on maintained records reflecting exhibited IO access patterns. Furthermore, an IO access may refer to a workload data write operation, or a workload data read operation, concerning workload data associated with a given workload. Accordingly, any IO access may at least specify a unique workload ID assigned to the given workload, one or more storage device addresses whereon the workload data for the given workload may reside, and one or more storage device block addresses referencing the storage device block(s), of the storage device(s), within which the workload data may specifically be stored. Moreover, processing of the IO accesses may result in the derivation of workload storage metadata (described above).

In Step 314, workload criticality class(es) for the workload(s) (identified in Step 300) is/are derived. Specifically, in one embodiment of the invention, the derivation may entail comparing a real-time number of incoming connections and/or an active workload data size associated with each workload against prescribed classification criteria. For example, say an administrator configures 3 workload criticality classes—denoted from highest to lowest priority as C1, C2, and C3. The C1 class may require the real-time number of incoming connections to exceed a first prescribed incoming connection threshold and/or the active workload data size to exceed a first prescribed active workload data size threshold. The C2 class may require the real-time number of incoming connections to meet or exceed a second prescribed incoming connection threshold, up to and including the first prescribed incoming connection threshold, and/or the active workload data size to meet or exceed a second prescribed active workload data size threshold, up to and including the first prescribed active workload data size threshold. Meanwhile, the C3 class may require the real-time number of incoming connections to fall below the second prescribed incoming connection threshold, and/or the active workload data size to fall below the second prescribed active workload data size threshold. Subsequently, based on the above classification criteria, zero or more workloads may be classified into the C1 class, zero or more workloads may be classified into the C2 class, and zero or more workloads may be classified into the C3 class. The aforementioned example is for explanatory purposes only and not intended to limit the scope of the invention. Thereafter, the process proceeds to Step 308.

Figure 4:
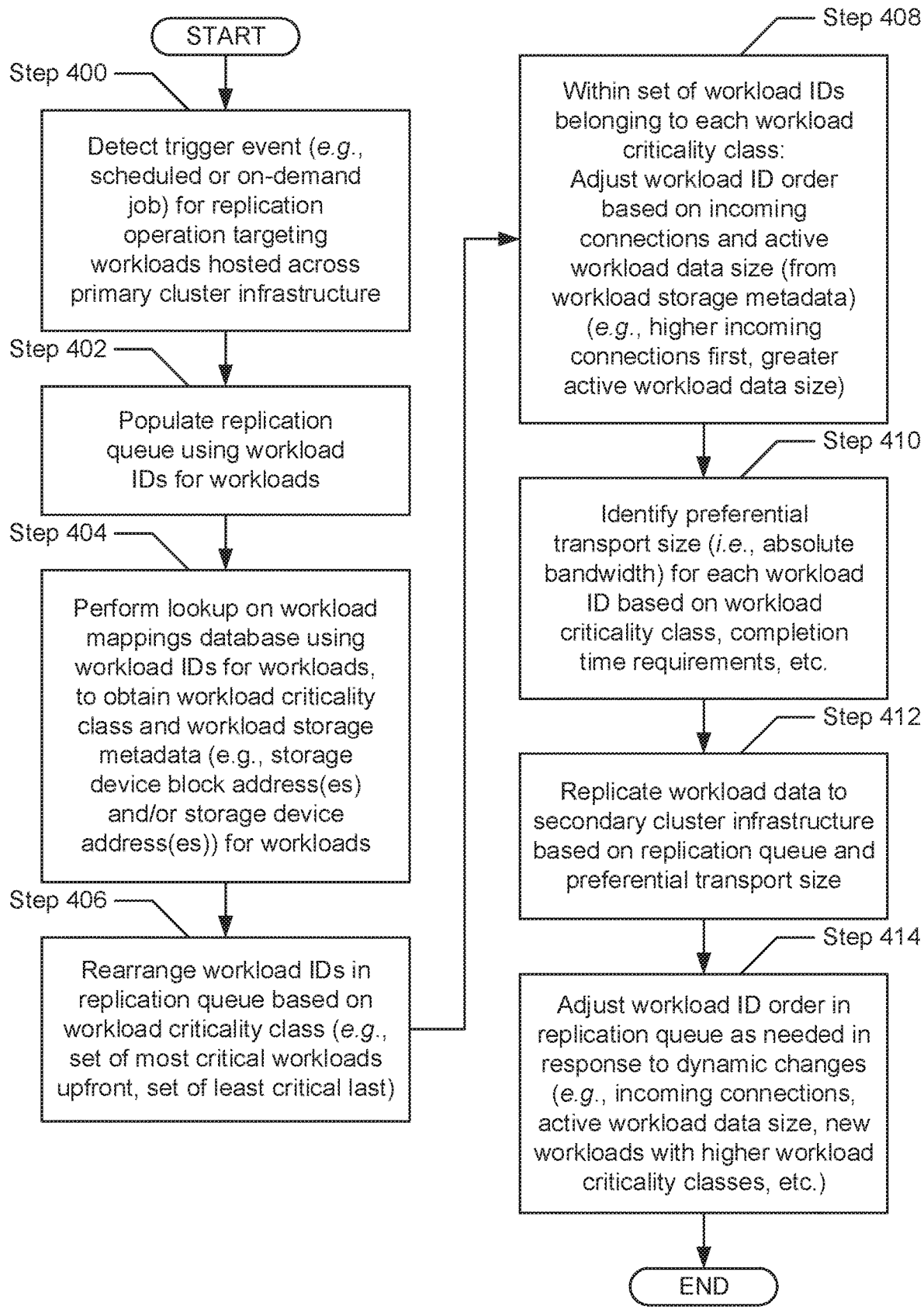
FIG. 4 shows a flowchart describing a method for replicating workload data in accordance with one or more embodiments of the invention.

FIG. 4 shows a flowchart describing a method for replicating workload data in accordance with one or more embodiments of the invention. The various steps outlined below may be performed by the preferential transport service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, a trigger event is detected. In one embodiment of the invention, the trigger event may pertain to a replication operation targeting workloads hosted across the primary cluster infrastructure (see e.g., FIG. 1). Further, the trigger event may, for example, take the form of a scheduled task, which may transpire periodically, or an on-demand, administrator-instantiated job.

In Step 402, a replication queue is populated using workload IDs assigned to the workloads (targeted in Step 400). In one embodiment of the invention, the replication queue may refer to an abstract data structure for maintaining a collection of data objects (e.g., workload IDs) in a configurable replication order.

In Step 404, lookups are performed on the workload mappings database (see e.g., FIG. 1) using the above-mentioned workload IDs, respectively. In one embodiment of the invention, each lookup may result in the identification of a given workload mapping (or database entry) associated with a given workload ID. Furthermore, from these identified workload mappings, a workload criticality class and storage metadata (both described above) associated with each workload ID may be obtained.

In Step 406, the replication queue (populated in Step 402) is adjusted based on the workload criticality classes (obtained in Step 404). More precisely, in one embodiment of the invention, workload IDs in the replication queue may be rearranged such that those associated with higher priorities may be positioned near the front of the replication queue, while others associated with lower priorities may be positioned farthest from the front of the replication queue. Through this adjustment, the workload IDs may be arranged (and sequentially ordered) in groups according to their respective workload criticality class (see e.g., FIG. 6B).

In Step 408, the replication queue (adjusted in Step 406) is further adjusted based on a real-time number of incoming connections to the workloads (targeted in Step 400). In one embodiment of the invention, an incoming connection may refer to an established connection (or a connection attempt) from a remote computing system (e.g., a client device operated by a user) to a given workload hosted on a cluster node (see e.g., FIG. 2). Furthermore, adjustment of the replication queue may entail, amongst each set of workload IDs grouped per a shared workload criticality class: rearranging the workload IDs such that those belonging to workloads associated with higher real-time incoming connections may be positioned at the front of the group, whereas others belonging to workloads associated with lower real-time incoming connections may be positioned at the back of the group (see e.g., FIGS. 6C-6E).

In one embodiment of the invention, should two or more workloads, respective to workload IDs in a given set of workload IDs, reflect the same real-time number of incoming connections, the incoming connection tie may be resolved based on an active workload data size determined for active workload data associated with the two or more workloads. Active workload data may refer to recently or frequently accessed workload data, which may be identified based on IO accesses directed to workload data by their respective workloads. On the other hand, the active workload data size may refer to the storage capacity (or space) (e.g., in bytes) consumed or occupied by active workload data for a given workload. Furthermore, the aforementioned two or more workloads may be ordered from highest to lowest active workload data size (see e.g., FIGS. 6C-6E).

In Step 410, preferential transport size are identified for the workload (targeted in Step 400). In one embodiment of the invention, a preferential transport size may refer to a measurable quantity (e.g., bits or bytes of data per second) or percentage of available network bandwidth that may be allocated and consumed to perform trans-cluster infrastructure workload data (and workload) replication. Further, the preferential transport size for a given workload may be determined based on the assigned workload criticality class associated with the given workload.

That is, in one embodiment of the invention, the various workload criticality classes may each map to a prescribed preferential transport size for the workload criticality class. For example, a first (high) workload criticality class may be allocated a first (high) value or percentage of available network bandwidth, a second (middle) workload criticality class may be allocated a second (middle) value or percentage of available network bandwidth, and a third (low) workload criticality class may be allocated a third (low) value or percentage of available network bandwidth. The aforementioned example is for explanatory purposes only and not intended to limit the scope of the invention.

In another embodiment of the invention, the various workload criticality classes may each map to certain service-level agreement (SLA) requirements, which may dictate the preferential transport size allocated for the workload criticality class. For example, the SLA requirement(s) for a first (high) workload criticality class may mandate that replication take no longer than a first (low) amount of time and, accordingly, a first (high) value or percentage of available network bandwidth may be allocated thereto to meet the SLA requirement(s) thereof. Further, the SLA requirement(s) for a second (middle) workload criticality class may mandate that replication take no longer than a second (middle) amount of time and, accordingly, a second (middle) value or percentage of available network bandwidth may be allocated thereto to meet the SLA requirement(s) thereof. Moreover, the SLA requirement(s) for a third (low) workload criticality class may mandate that replication take no longer than a third (high) amount of time and, accordingly, a third (low) value or percentage of available network bandwidth may be allocated thereto to meet the SLA requirement(s) thereof. The aforementioned example is for explanatory purposes only and not intended to limit the scope of the invention.

In Step 412, active workload data is replicated from the primary cluster infrastructure to the secondary cluster infrastructure (see e.g., FIG. 1) in accordance with the replication queue (finalized in Step 408). More specifically, in one embodiment of the invention, in the replication order of the workload IDs populating the replication queue, active workload data associated with the leading (or front-most) workload ID may be replicated to the secondary cluster infrastructure using the preferential transport size (identified for that active workload data in Step 410). Upon completion of the workload data replication for the leading workload ID, a next workload ID in the replication order may become the new leading workload ID, wherein which active workload data associated with the new leading workload ID may then be replicated to the secondary cluster infrastructure using the preferential transport size (identified for that active workload data in Step 410).

In Step 414, the workload data replication process (initiated in Step 412) may be adjusted dynamically based on real-time changes to any of the above-mentioned factors (e.g., incoming connections, active workload data size, etc.) governing the replication order of the workload IDs populating the replication queue. By another token, the preferential transport size allocated to active workload data, in the process of being replicated to the secondary cluster infrastructure, may be throttled should a new workload, instantiated on the primary cluster infrastructure, exhibit a higher replication prioritization than the workload whose active workload data may be currently replicating (see e.g., FIG. 6G).

Figure 5:
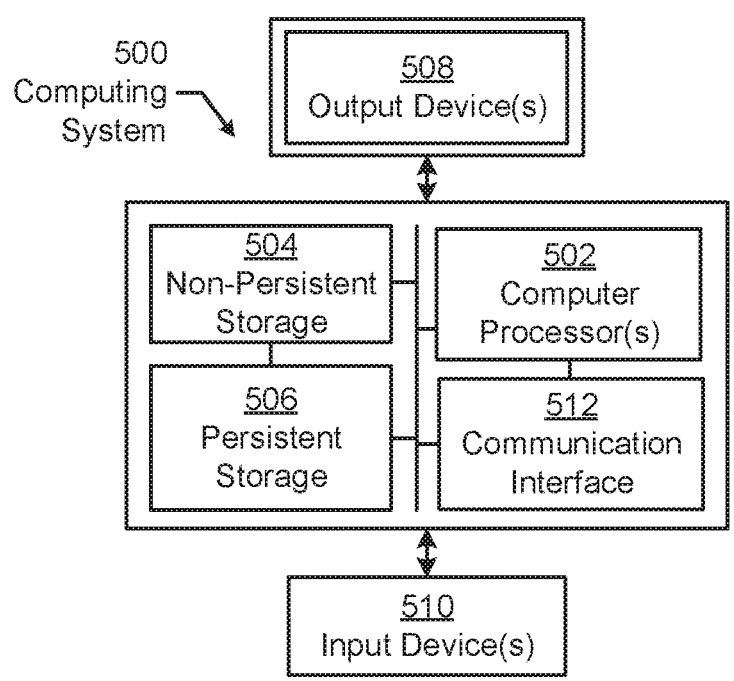
FIG. 5 shows an exemplary computing system in accordance with one or more embodiments of the invention.

FIG. 5 shows an exemplary computing system in accordance with one or more embodiments of the invention. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a central processing unit (CPU) and/or a graphics processing unit (GPU). The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one embodiment of the invention, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

FIGS. 6A-6G show an exemplary scenario in accordance with one or more embodiments of the invention. The exemplary scenario, described in conjunction with components shown in FIGS. 6A-6G, is for explanatory purposes only and not intended to limit the scope of the invention.

Figure 6A:
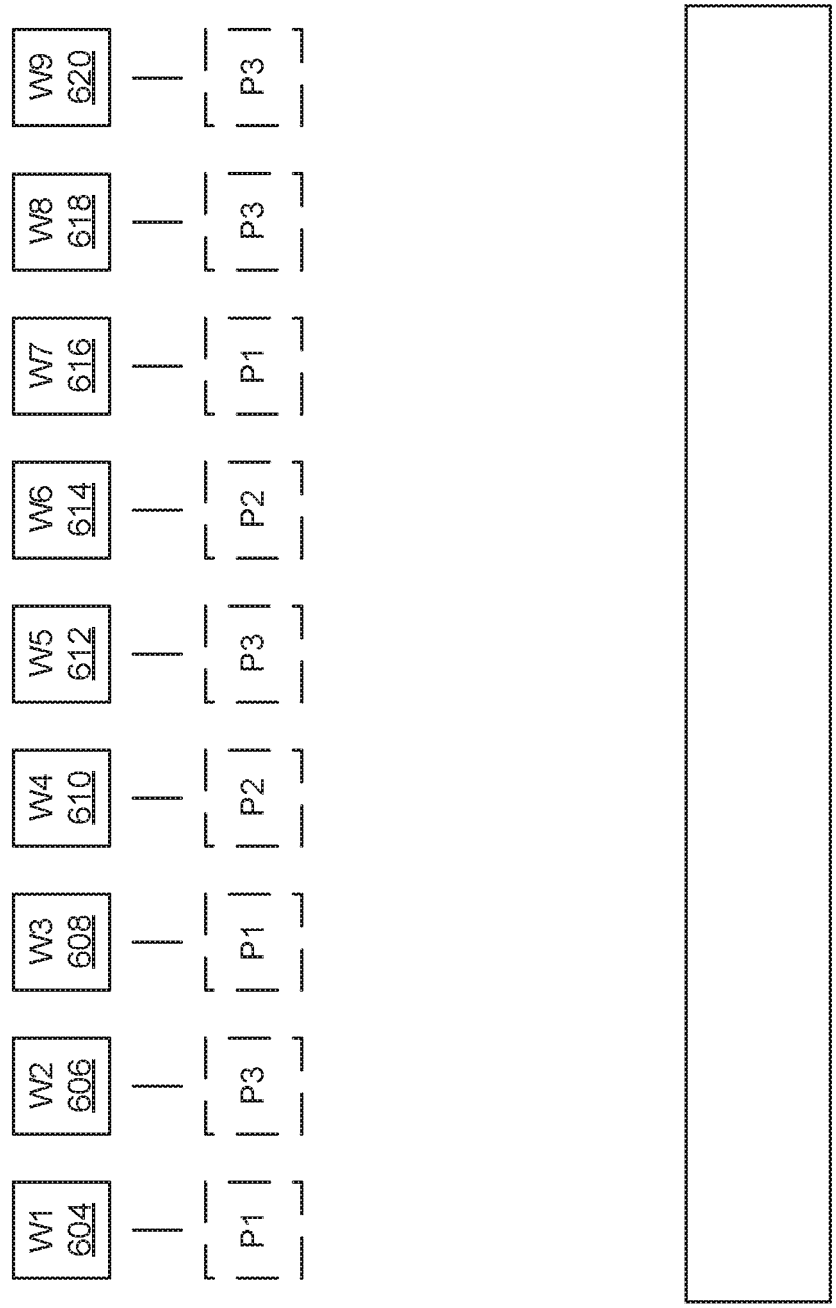
FIGS. 6A-6G show an exemplary scenario in accordance with one or more embodiments of the invention.

Turning to FIG. 6A, consider nine workloads (W), hosted across a primary cluster infrastructure, which have been targeted for workload data replication. Further, each of the nine workloads have been assigned a workload criticality class reflecting the importance of the workload (and associated workload data) to operations of the primary cluster infrastructure. These workload criticality classes include: (a) a high-importance (P1) class; (b) a mid-importance (P2) class; and (c) a low-importance (P3) class. Subsequently, of the nine workloads: (i) the first, third, and seventh workloads (604, 608, 616) have been assigned to the high-importance (P1) class; (ii) the fourth and sixth workloads (610, 614) have been assigned to the mid-importance (P2) class; and (iii) the remaining (i.e., second, fifth, eighth, and ninth) workloads (606, 612, 618, 620) have been assigned to the low-importance (P3) class. Moreover, a replication queue (602) (described above) is initialized with an empty state.

Figure 6B:
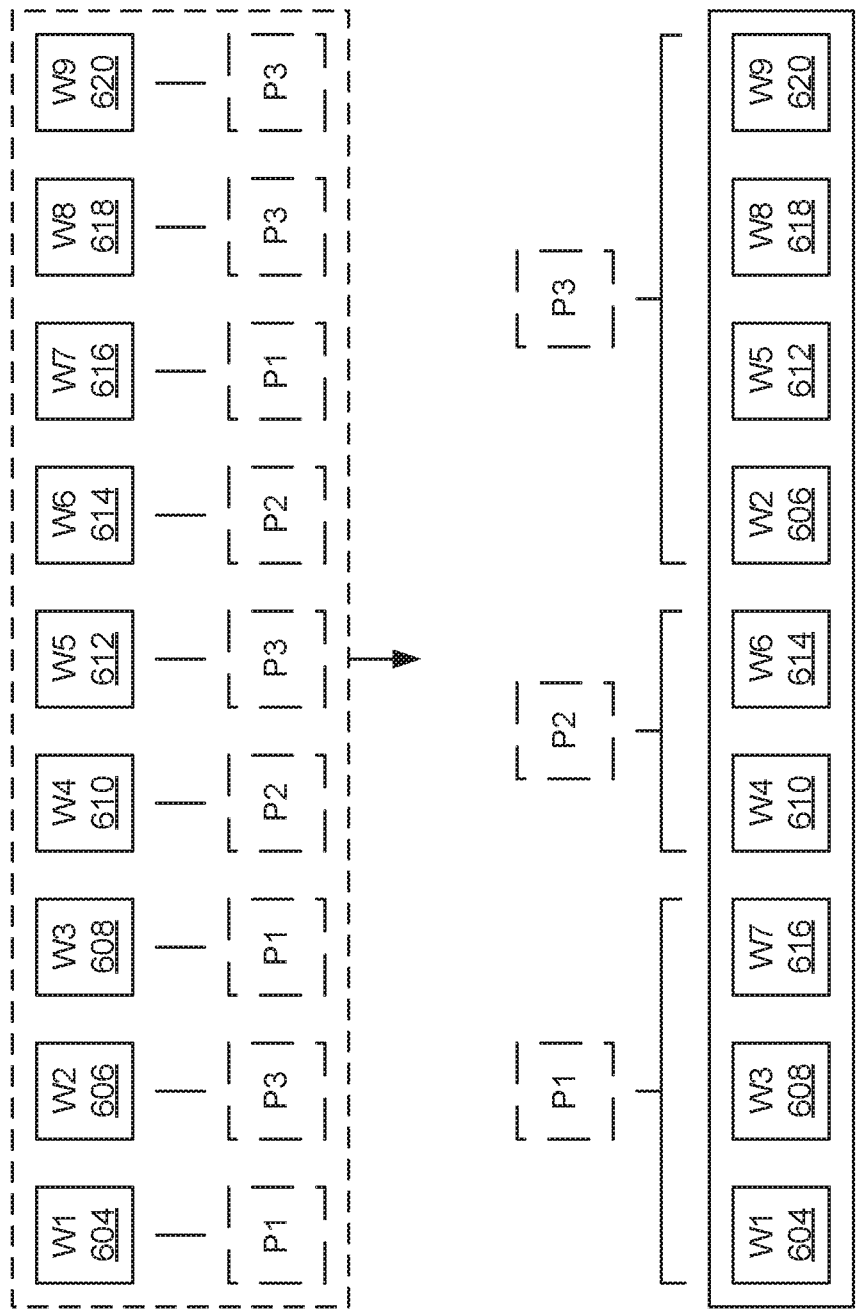

Turning to FIG. 6B, the replication queue (602) is subsequently populated with workload IDs respective to the above-mentioned nine workloads. More precisely, an initial replication order of the workload IDs positions the workload IDs relative to one another based on the high-, mid-, and low-importance of their assigned workload criticality classes. As illustrated, workload IDs for the three (i.e., first, third, and seventh) workloads (604, 608, 616) directed to the high-importance (P1) class are positioned foremost (or front-most) in the replication queue; workload IDs for the two (i.e., fourth and sixth) workloads (610, 614) directed to the mid-importance (P2) class are positioned next behind the high-importance (P1) class workloads (604, 608, 616); and workload IDs for the four remaining (i.e., second, fifth, eighth, and ninth) workloads (606, 612, 618, 620) are positioned behind the mid-importance (P2) class workloads (610, 614). Further, as of this point, the set of workload IDs, pertaining to each particular workload criticality class, is not arranged in any particular order.

Figure 6C:
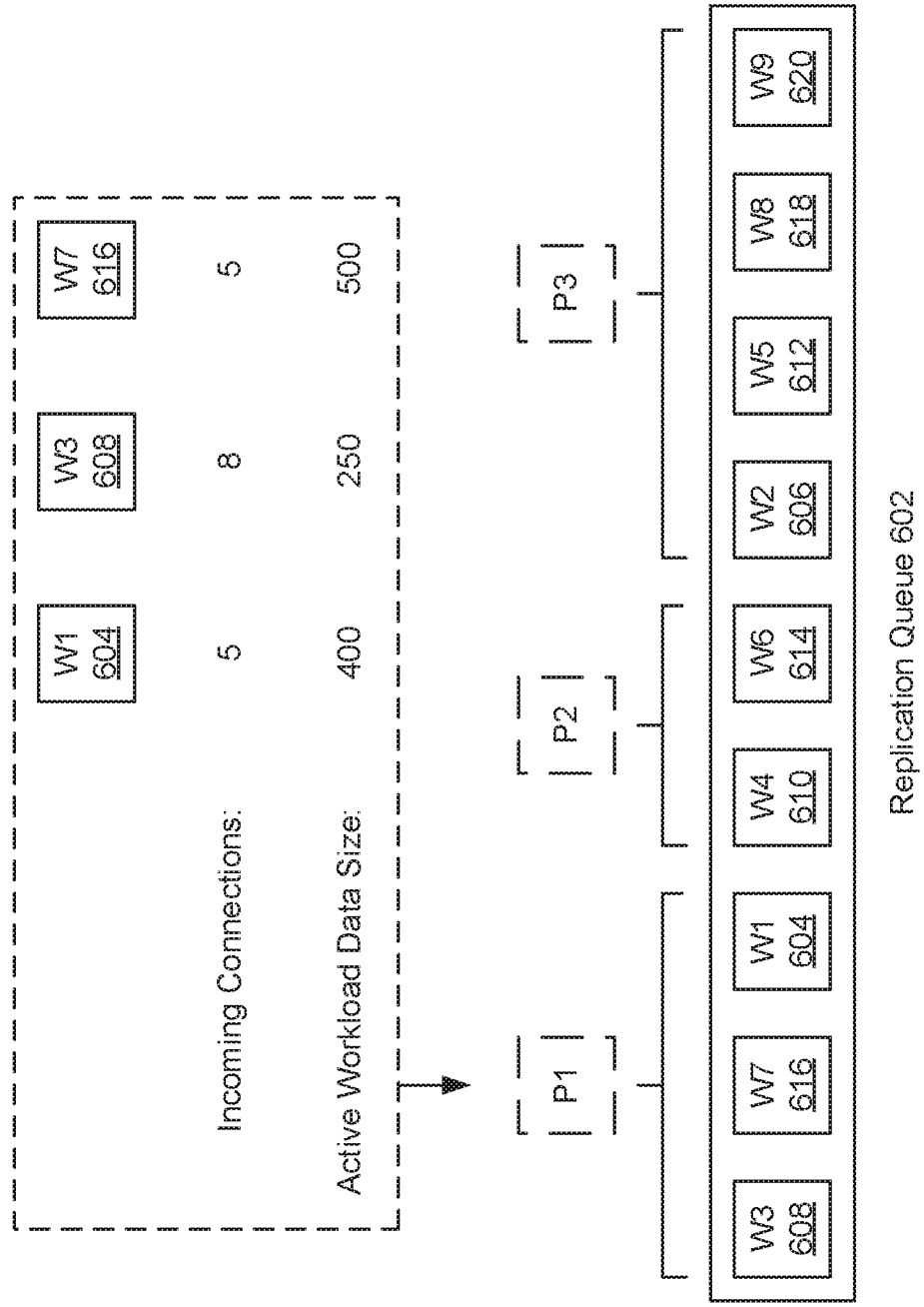

Turning to FIG. 6C, the real-time number of incoming connections for the three (i.e., first, third, and seventh) workloads (604, 608, 616), belonging to the high-importance (P1) class, are used to adjust the replication order of this first subset of workload IDs within the front-most portion of the replication queue (602). As presented, five, eight, and five real-time incoming connections are identified for the first, third, and seventh workloads (604, 608, 616), respectively. Based on these incoming connections, the third workload (608) is placed in a first (or leading) position in the replication queue (602) for having the highest real-time number of incoming connections. Meanwhile, the first and seventh workloads (604, 616) are tied for a second position in the replication queue (602) for having the same next-highest real-time number of incoming connections. To resolve the aforementioned tie, the active workload data size, measuring the storage capacity consumed by active workload data for the first and seventh workloads (604, 616), in particular, is used. Accordingly, because the active workload data size for the seventh workload (616) (i.e., 500 GB) is found to be greater than the active workload data size for the first workload (604) (i.e., 400 GB), the former is placed in the second position, whereas the latter is placed in the third position, of the replication queue (602).

Figure 6D:
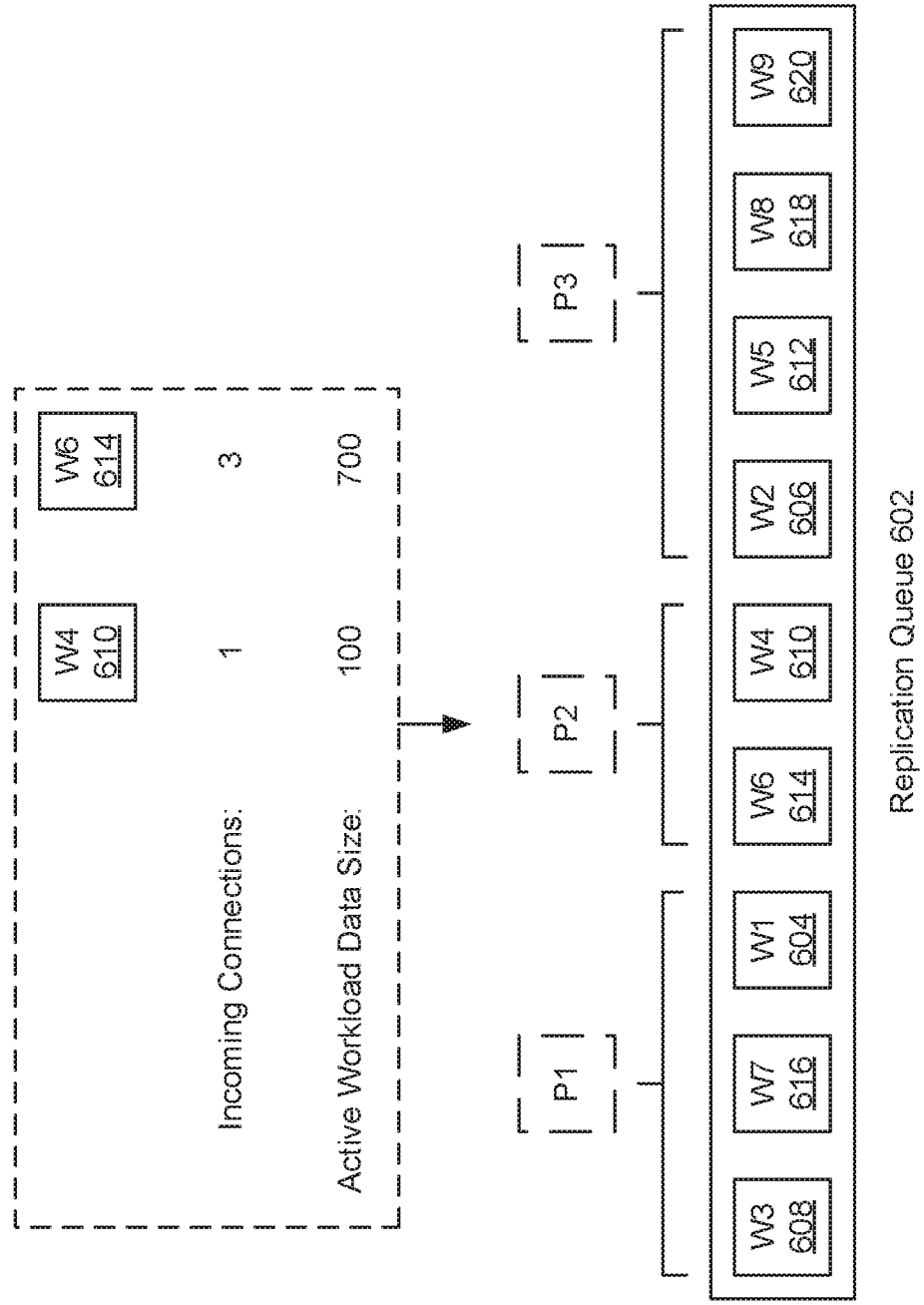

Turning to FIG. 6D, the real-time number of incoming connections for the two (i.e., fourth and sixth) workloads (610, 614), belonging to the mid-importance (P2) class, are used to adjust the replication order of this second subset of workload IDs within the middle portion of the replication queue (602). As presented, one and three real-time incoming connections are identified for the fourth and sixth workloads (610, 614), respectively. Based on these incoming connections, the sixth workload (614) is placed in a fourth position, and the fourth workload (610) is placed in a fifth position, in the replication queue (602) since the incoming connections of the former exceed those of the latter. Further, because no ties for positions between two or more workloads occur, the active workload data size may not be identified to resolve those ties.

Figure 6E:
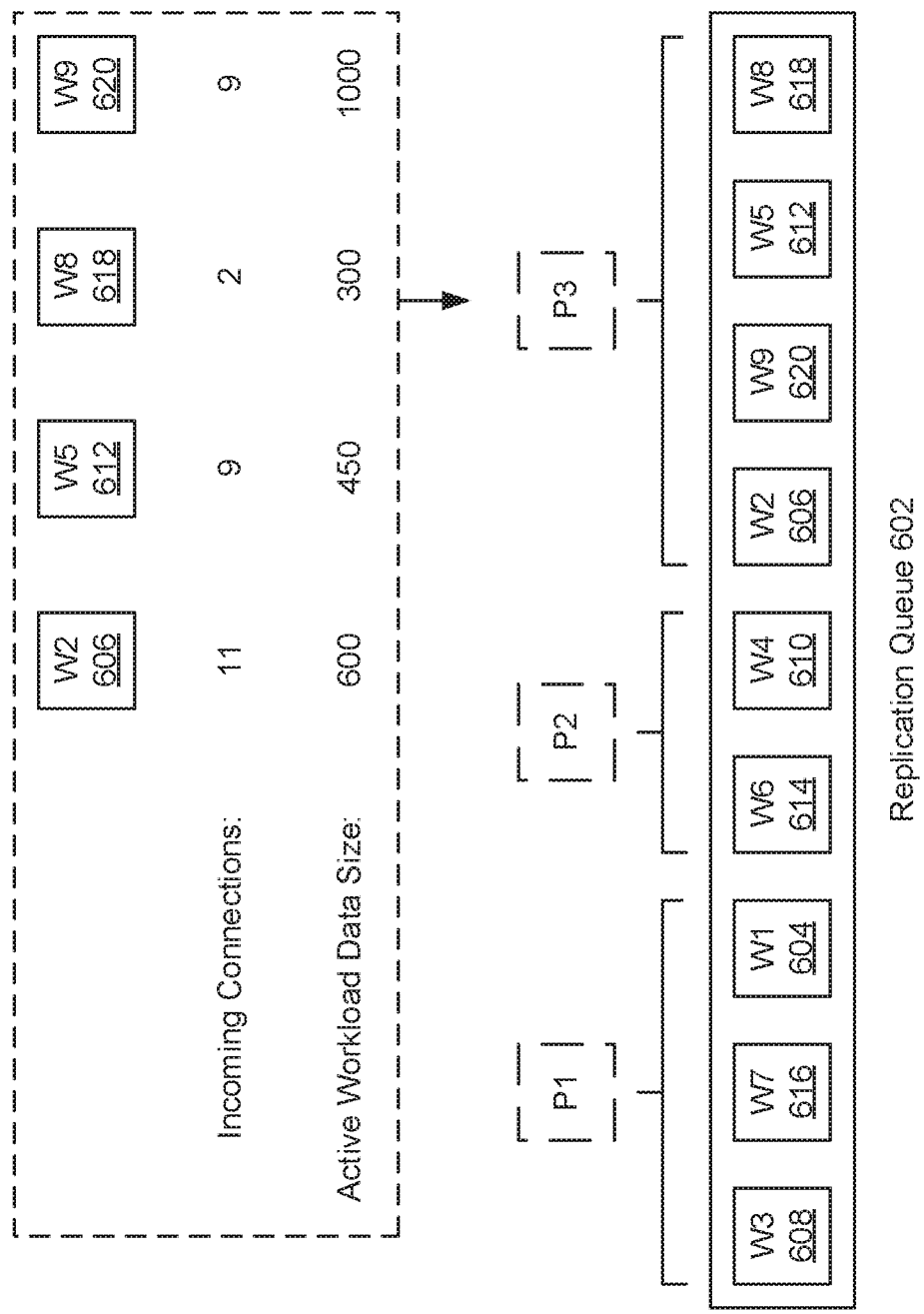

Turning to FIG. 6E, the real-time number of incoming connections for the remaining four (i.e., second, fifth, eighth, and ninth) workloads (606, 612, 618, 620), belonging to the low-importance (P3) class, are used to adjust the replication order of this third subset of workload IDs within the back portion of the replication queue (602). As presented, eleven, nine, two, and nine real-time incoming connections are identified for the second, fifth, eighth, and ninth workloads (606, 612, 618, 620), respectively. Based on these incoming connections, the second workload (606) is placed in the sixth position in the replication queue (602) for having the highest real-time number of incoming connections, the fifth and ninth workloads (612, 620) are tied for placement in the seventh position in the replication queue (602) for each having the next-highest real-time number of incoming connections, and the eighth workload (618) claims the last (i.e., ninth) position in the replication queue (602) for having the lowest real-time number of incoming connections. To resolve the aforementioned tie, the active workload data size, measuring the storage capacity consumed by active workload data for the fifth and ninth workloads (612, 620), in particular, is used. Accordingly, because the active workload data size for the ninth workload (620) (i.e., 1000 GB) is found to be greater than the active workload data size for the fifth workload (612) (i.e., 450 GB), the former is placed in the seventh position, whereas the latter is placed in the eighth position, in the replication queue (602).

Figure 6F:
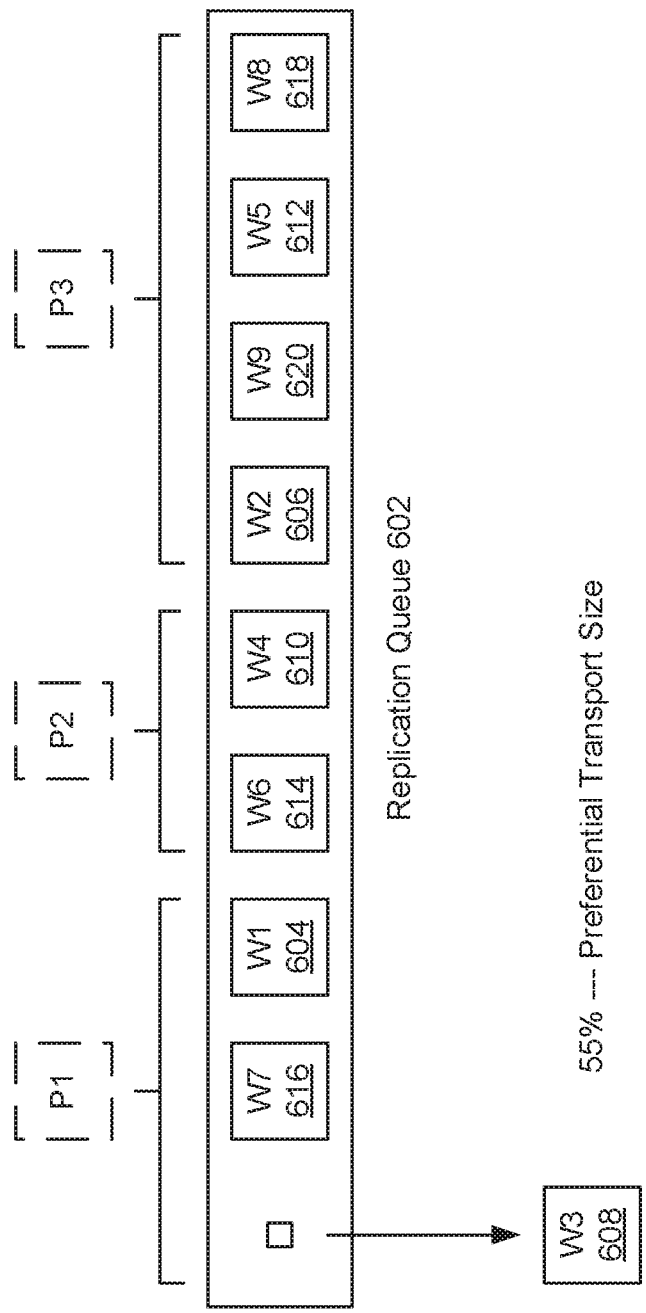

Turning to FIG. 6F, based on the finalized replication queue (602), replication of the active workload data, for the nine workloads, to a secondary cluster infrastructure, commences. More specifically, active workload data for the third workload (608) is foremost to be replicated, as the workload ID thereof occupies the leading position in the replication queue (602). Furthermore, based on the high-importance (P1) workload criticality class to which the third workload (608) had been assigned, a preferential transport size equivalent to 55% of the available network bandwidth is allocated to implement the replication process.

Figure 6G:
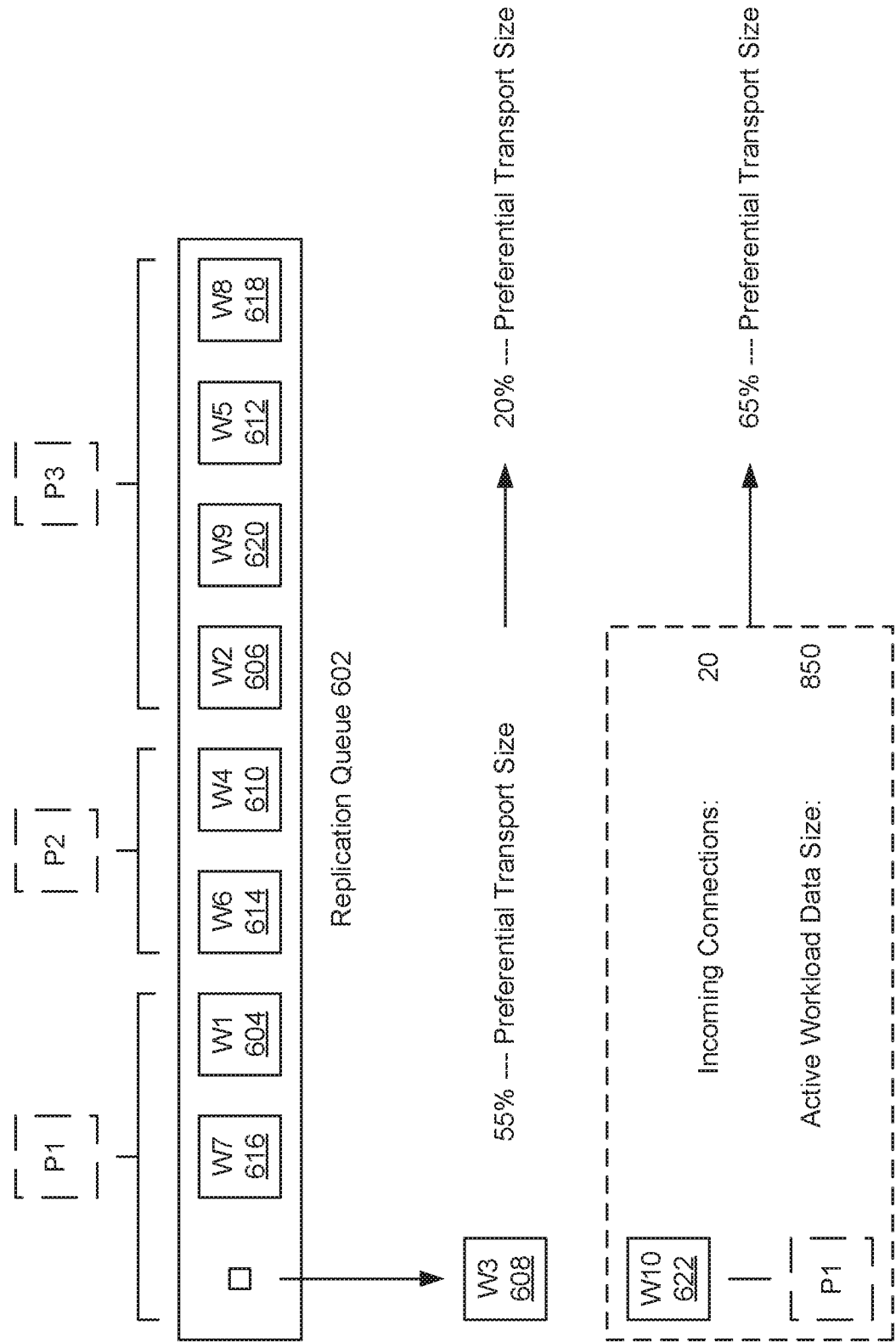

Turning to FIG. 6G, consider that during replication of active workload data for the third workload (608), a new (i.e., tenth) workload (622) is deployed on the primary cluster infrastructure. The new workload (622) is assigned to the high-importance (P1) workload criticality class, and is found to have twenty real-time incoming connections. Though the third and new workloads (608, 622) belong to the same high-importance (P1) class, replication of active workload data for the new workload (622) is identified to be more critical than the ongoing replication of active workload data for the third workload (608). Accordingly, the preferential transport size, allocated to the replication of active workload data for the third workload (608), is throttled from 55% to 20%. Meanwhile, due to the aforementioned determination, replication priority is given to the new workload (622)—the replication process of which thus is allocated a high preferential transport size equivalent to 65% of the available network bandwidth.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for workload data replication, comprising:
    detecting a trigger event for a replication operation targeting a plurality of workloads hosted across a primary cluster infrastructure;
    populating, in response to detecting the trigger event, a replication queue using a plurality of workload identifiers (IDs) for the plurality of workloads;
    adjusting a replication order of the plurality of workload IDs in the replication queue based on a workload criticality class assigned to each workload;
    replicating, based on the replication order, active workload data for the plurality of workloads to a secondary cluster infrastructure; and
    prior to replicating the active workload data to the secondary cluster infrastructure:
        adjusting the replication order based further on a number of incoming connections identified for each workload and an active workload data size associated with the active workload data for each workload.

2. The method of claim 1, wherein the workload criticality class for each workload is derived from at least one selected from a group consisting of the number of incoming connections and the active workload data size.

3. The method of claim 1, wherein the replication order is adjusted based further on the active workload data size when at least two workloads are tied reflecting a same number of incoming connections.

4. The method of claim 3, wherein the at least two workloads share a same workload criticality class.

5. The method of claim 1, wherein replicating the active workload data to the secondary cluster infrastructure, comprises:
    allocating, based at least on the workload criticality class, a preferential transport size for each workload of the plurality of workloads; and
    replicating, to the secondary cluster infrastructure, the active workload data for the workload using the preferential transport size.

6. The method of claim 5, wherein the preferential transport size comprises network bandwidth.

7. A non-transitory computer readable medium (CRM) comprising computer readable program code, which when executed by a computer processor, enables the computer processor to:
    detect a trigger event for a replication operation targeting a plurality of workloads hosted across a primary cluster infrastructure;
    populate, in response to detecting the trigger event, a replication queue using a plurality of workload identifiers (IDs) for the plurality of workloads;
    adjust a replication order of the plurality of workload IDs in the replication queue based on a workload criticality class assigned to each workload;
    replicate, based on the replication order, active workload data for the plurality of workloads to a secondary cluster infrastructure; and
    prior to replicate the active workload data to the secondary cluster infrastructure:
        adjust the replication order based further on a number of incoming connections identified for each workload and an active workload data size associated with the active workload data for each workload.

8. The non-transitory CRM of claim 7, wherein the workload criticality class for each workload is derived from at least one selected from a group consisting of the number of incoming connections and the active workload data size.

9. The non-transitory CRM of claim 7, wherein the replication order is adjusted based further on the active workload data size when at least two workloads are tied reflecting a same number of incoming connections.

10. The non-transitory CRM of claim 9, wherein the at least two workloads share a same workload criticality class.

11. The non-transitory CRM of claim 7, comprising computer readable program code, which when executed by the computer processor, further enables the computer processor to:
    replicate the active workload data to the secondary cluster infrastructure, by:
        allocating, based at least on the workload criticality class, a preferential transport size for each workload of the plurality of workloads; and
        replicating, to the secondary cluster infrastructure, the active workload data for the workload using the preferential transport size.

12. The non-transitory CRM of claim 11, wherein the preferential transport size comprises network bandwidth.

13. A system, comprising:
    primary and secondary cluster infrastructures;
    a computer processor interposed between and operatively connected to the primary and second cluster infrastructures; and
    a workload data replicator executing on the computer processor, and programmed to:
        detect a trigger event for a replication operation targeting a plurality of workloads hosted across the primary cluster infrastructure;

populate, in response to detecting the trigger event, a replication queue using a plurality of workload identifiers (IDs) for the plurality of workloads;

adjust a replication order of the plurality of workload IDs in the replication queue based on a workload criticality class assigned to each workload; and replicate, based on the replication order, active workload data for the plurality of workloads to the secondary cluster infrastructure; and prior to replicate the active workload data to the secondary cluster infrastructure:

adjust the replication order based further on a number of incoming connections identified for each workload and an active workload data size associated with the active workload data for each workload.

14. The system of claim 13, further comprising:

a database operatively connected to the workload data replicator, wherein a workload mapping for each workload is maintained on the database and comprises a workload ID for the workload, the workload criticality class assigned to the workload, and workload storage metadata of the active workload data associated with the workload.

15. The system of claim 14, further comprising:

a criticality and dependency mapper executing on the computer processor, and operatively connected to the database, wherein the storage metadata for each workload is identified by the criticality and dependency mapper based on input-output (IO) operations directed to the active workload data associated with the workload.

16. The system of claim 15, wherein the primary cluster infrastructure, comprises:

a plurality of cluster nodes across which the plurality of workloads are hosted;

shared cluster storage comprising a plurality of storage devices across which the active workload data for the plurality of workloads are stored; and a workload IO monitor interposed between the plurality of cluster nodes and the shared storage cluster, and configured to assist the criticality and dependency mapper in identifying the storage metadata for each workload.

* * * * *